United States Patent [19]

Bodenmann et al.

[11] 4,247,006

[45] Jan. 27, 1981

[54] CAPSULE BODY, IN PARTICULAR FOR USE WITH A JOINED CAPSULE FOR A PHARMACEUTICAL PREPARATION, AND METHOD OF AND APPARATUS FOR PRODUCING IT

[75] Inventors: Hans U. Bodenmann, Muenchenstein, Switzerland; Louis P. Van Herle, Berchem-Antwerp; Winand H. Martens, Belsele, both of Belgium

[73] Assignee: Capsugel AG, Basel, Switzerland

[21] Appl. No.: 57,937

[22] Filed: Jul. 16, 1979

Related U.S. Application Data

[63] Continuation of Ser. No. 905,918, May 15, 1978, abandoned.

[30] Foreign Application Priority Data

May 20, 1977 [DE] Fed. Rep. of Germany ....... 2722806

[51] Int. Cl.³ .................. B65D 83/04; B65D 6/12; B29C 13/04
[52] U.S. Cl. .................... 206/528; 220/4 B; 220/8; 264/215; 264/304; 425/275; 428/35
[58] Field of Search ............... 264/215, 304, 305, 306; 425/269, 275; 220/4 B, 8; 206/528, 530; 428/35

[56] References Cited

U.S. PATENT DOCUMENTS

| 525,844 | 9/1894 | Hobbs | 206/530 |
|---|---|---|---|
| 525,845 | 9/1894 | Hobbs | 206/530 |
| 2,936,493 | 5/1960 | Scherer | 264/304 |
| 3,258,115 | 6/1966 | Kath | 206/530 |
| 3,285,408 | 11/1966 | Carnaghi et al. | 220/8 |
| 3,399,803 | 9/1968 | Oglevee et al. | 206/530 |
| 3,664,495 | 5/1972 | Graham et al. | 206/530 |
| 3,927,195 | 12/1975 | Messora | 220/8 |
| 4,040,536 | 8/1977 | Schwarz | 220/8 |
| 4,138,013 | 2/1979 | Okajima | 206/528 |

FOREIGN PATENT DOCUMENTS 800406 8/1958 United Kingdom .

Primary Examiner—William R. Dixon, Jr.
Attorney, Agent, or Firm—Louis S. Gillow

[57] ABSTRACT

Capsule body, in particular for use with a joined capsule for a pharmaceutical preparation, and method of and apparatus for producing it.

7 Claims, 5 Drawing Figures

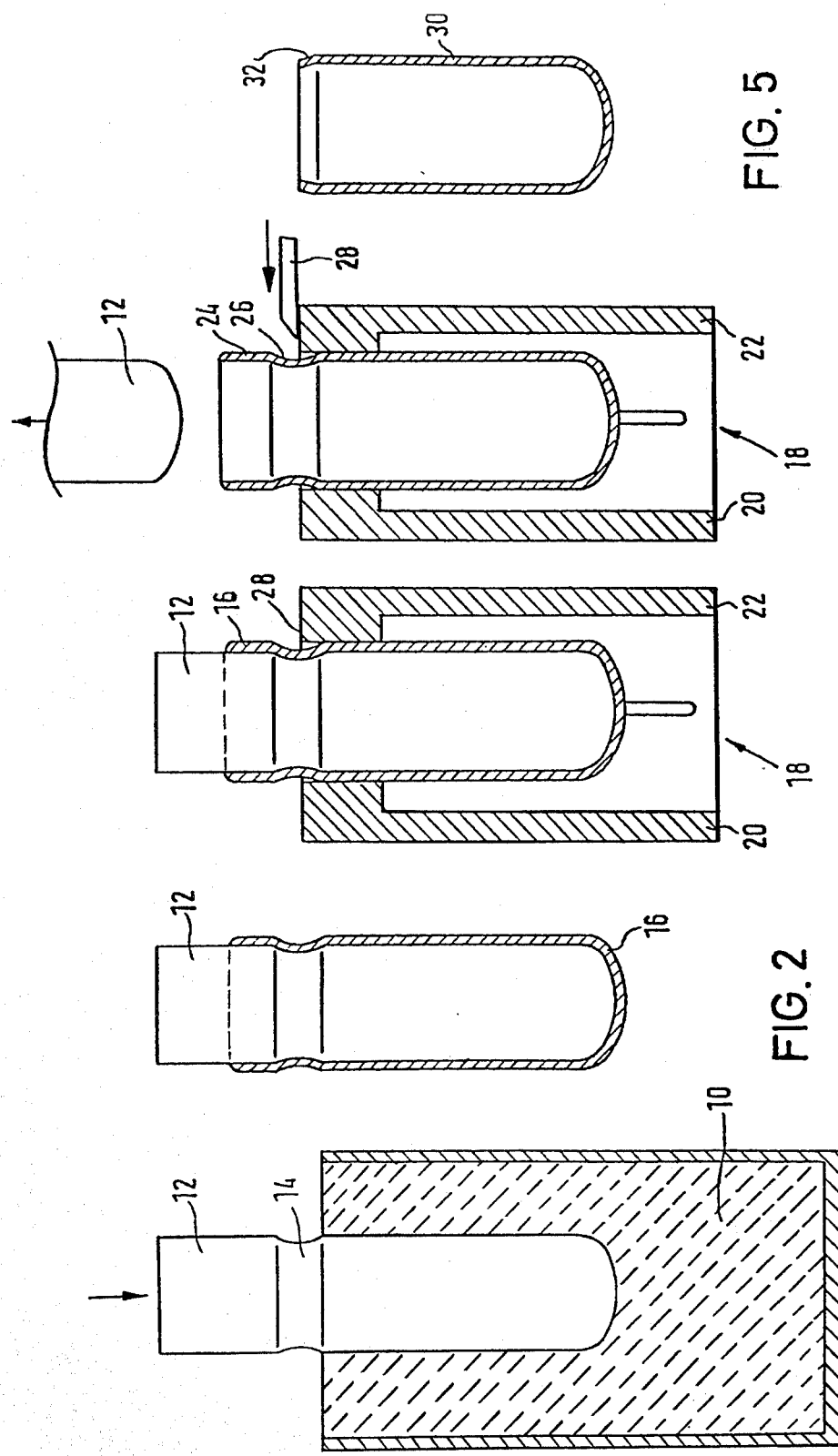

CAPSULE BODY, IN PARTICULAR FOR USE WITH A JOINED CAPSULE FOR A PHARMACEUTICAL PREPARATION, AND METHOD OF AND APPARATUS FOR PRODUCING IT

This is a continuation of application Ser. No. 905,918 filed May 15, 1978, now abandoned.

This invention relates to a capsule body having substantially the shape of a cylinder closed at one end, in particular for use with a joined capsule for a pharmaceutical preparation, and comprising a capsule body and a capsule cap fitted thereon. The invention relates furthermore to a method of producing such a capsule body and an apparatus for carrying out the method which comprises an immersing pin adapted to be immersed into a bath of liquid that solidifies and forms the wall of the capsule body.

Recently there has been an increasing demand for joined capsules having a body part and a cap telescoped thereon. Joined capsules of this kind are for example readily suited for receiving pharmaceutical preparations and other substances which are needed in portions and have to be stored carefully. Body part and cap of the conventional joined capsule are so designed that the cap fits exactly on the body part and, when telescoped onto the body part, enters into frictional engagement with it. It is possible to form in addition corrugations or indentations in the side wall of the body part and of the cap that are complementary to each other and provide for a positive engagement of body part and cap.

Joined capsules of this kind are mostly filled in such a manner that the body part is made to extend with its open end upwardly, whereupon the substance to be received is filled into the body part, and whereafter the cap is telescoped onto the body part filled with the substance. Such a filling operation proceeds at brief cycle intervals when large quantities are involved. Due to manufacturing tolerances of the outer diameter of the body part and of the internal diameter of the cap, as well as due to tolerances pertaining to the filling machine owing to which the orientation of body part and cap is not always perfect, or due to remainder of filling material at the body part, it is possible when telescoping the cap and the body part that the free edge of the cap abuts against the free edge of the body part which may lead to destroying of the cap and/or the body part, or may even be responsible for a standstill of the filling machine.

The invention is based on the problem of reducing the danger of an abutment of the free edges of the capsule body and the capsule cap when they are telescoped.

Inaccuracies in the manufacture of the capsule body or of a capsule cap, or a faulty orientation of capsule body and capsule cap upon being telescoped, or remainder of filling material thus can no longer cause an abutting of the free edge of the capsule body against the free edge of the capsule cap in such a manner that a further ready telescoping of body part and cap is endangered.

The capsule body according to the invention is produced preferably according to the method described hereinabove, which is further developed according to the invention in that the capsule body is first manufactured with excess length, and a constriction in the area of its open end later on, and is then severed in the area of the constriction.

Advantageously, the overlong capsule body is severed at the place where the constriction has its smallest diameter. With this one achieves that the diameter of the finished capsule body is as small as possible at the free end thereof when the constriction has a given depth.

The portion of the problem underlying the invention relating to the apparatus is solved with an apparatus of the kind described hereinabove, according to the invention, in such a manner that the immersing pin is formed with a continuous recess spaced from its free end immersing into the bath. In this way, a capsule body is formed on the immersing pin having a constriction corresponding to the recess when the immersing pin is moved out of the bath.

Advantageously, the axial width of the recess is about 10 times to 20 times as large as its depth. This dimensioning allows a removal of the capsule body having solidified on the immersing pin, from said immersing pin without any danger of subjecting the immersing pin to a too high mechanical stress resulting in a tearing in the area of the recess where it has to expand when being removed from the immersing pin.

Capsule bodies according to the invention are not only suited for use with joined capsules, i.e. for being inserted into a corresponding capsule cap, but can as such be used as capsules; they are for instance first filled with powdery or liquid material and are then closed with a pasty, solidifying sealing composition forming a bond with the material of the capsule body. The constriction in the area of the free end of the inventive capsule body provides in this connection a particularly safe support of the sealing composition since a cover layer formed by the sealing composition is in a kind of positive engagement with the capsule body owing to the constriction of the capsule body. When the capsule body is made for example of gelatine, the sealing composition used preferably is also gelatine since a particularly safe bond is thereby achieved between the layer of gelatine sealing the capsule body and the side wall of the capsule body.

The invention will now be described in more detail with reference to schematic drawings, in which are shown in FIGS. 1 to 5 various method steps in the production of a capsule body.

FIG. 1 shows a bath 10 of solidifying liquid, for instance gelatine, and an immersing pin 12 whose lower end is rounded and which has an annularly extending recess 14. The immersing pin is first greased together with a plurality of other, like immersing pins, by means of a conventional apparatus (not illustrated), and is then immersed into the bath 10 beyond the recess 14.

When moving the immersing pin 12 out of the bath 10, a layer 16 of solidifying liquid remains adhered to the immersing pin 12. To ensure that approximately the same thickness of the said layer is maintained for as long as the liquid has not solidified to an extent that it is no longer flowable, the immersing pin 12 is rotated about a transverse axis by the conventional apparatus causing the end being the lower one according to FIG. 2 to be sometimes up and sometimes down.

As soon as the layer 16 has solidified the immersing pin 12 is clamped into a cartridge 18 formed of two or more parts, parts 20, 22 thereof being moved towards each other, so that they radially engage the solidified layer 16. The immersing pin 12 as illustrated in FIG. 4, is then moved out of the cartridge 18 in upward direction, and the layer 16 remains in the cartridge 18 as body 24 formed with excess length. The recess 14 in the immersing pin is so dimensioned that the immersing pin 12 can be moved out of the layer 16, or the overlong body 24 without the positive engagement of a constriction 26 formed at the body 24 with the recess 14 forming an obstacle to such movement. Various dimensioning ranges are possible depending on the elasticity of the material of the body 24. The recess 14 or an immersing pin 12 having a diameter of about 6.7 mm, has for instance an axial length of about 1.5 mm and a depth of about 0.09 mm.

The end face of the cartridge 18 is planar and in alignment with the deepest place of the constriction 26. After having removed the immersing pin 12 the overlong body 24 is severed at the deepest place of the constriction 26, by means of a knife 28, while the cartridge 18 is rotated together with the body part 24 about the longitudinal axis thereof.

The finished body part 30 is released by radially moving apart parts 20 and 22 of the cartridge 18, which is formed with a reduced diameter in the area 32 of its open end.

It is possible to use conventional apparatuses for carrying out the method illustrated in FIGS. 1 to 5 whose immersing pins are replaced by immersing pins 12 in accordance with FIG. 1.

We claim:

1. A capsule body having substantially the shape of a cylinder closed at one end, in particular for use with a joined capsule for a pharmaceutical preparation, and comprising a capsule body characterized in that the capsule body has a reduced diameter in the area of its open end.

2. An improved capsule body having substantially the shape of a hollow cylinder which is closed at one end wherein said improvement is that the open end of said capsule body has a constrictingly reduced external diameter.

3. The capsule body of claim 2 molded from gelatin.

4. The capsule body of claim 2 having an indentation in the side wall.

5. A capsule for a pharmaceutical preparation comprising, a substantially cylindrical capsule body and a capsule cap fitted thereon characterized in that the capsule body prior to and during joining with a telescopically joinable capsule cap with respect to said shape has a constrictingly reduced diameter in the free edge area of its open end such that the free edge of the cap does not abut against the free edge of the body when brought together in joining relation.

6. The capsule of claim 5 molded from gelatin.

7. The capsule of claim 5 where said capsule body and said capsule cap have an indentation and said indentations provide for a positive engagement of said body to said cap.

* * * * *